Sept. 16, 1924.　　　　　　　　　　　　　　　　1,508,986
M. L. ORD
PHONOGRAPH
Filed July 27, 1922　　　11 Sheets-Sheet 1
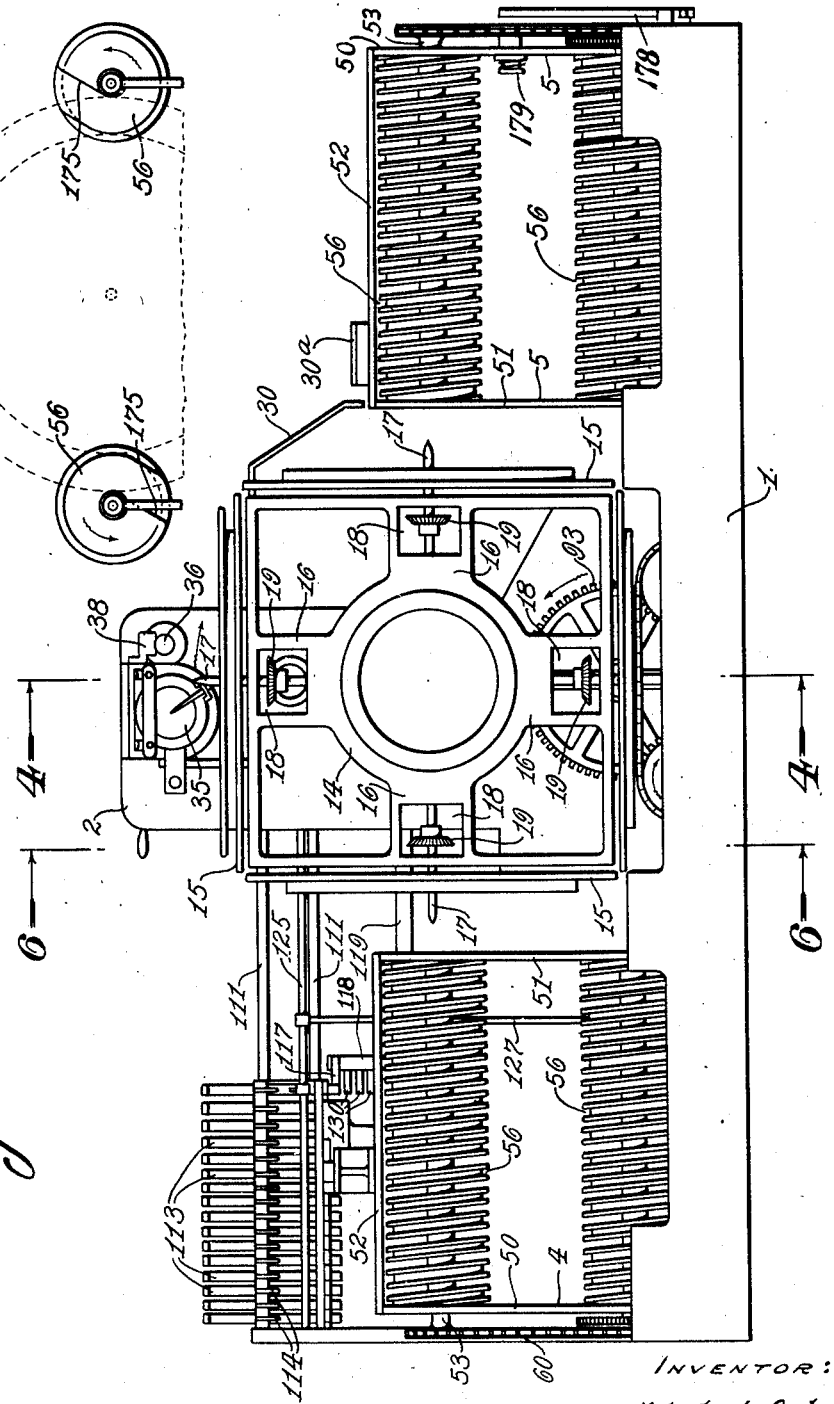
INVENTOR:
Malcolm L. Ord,
By John W. Bruninga,
HIS ATTORNEY.

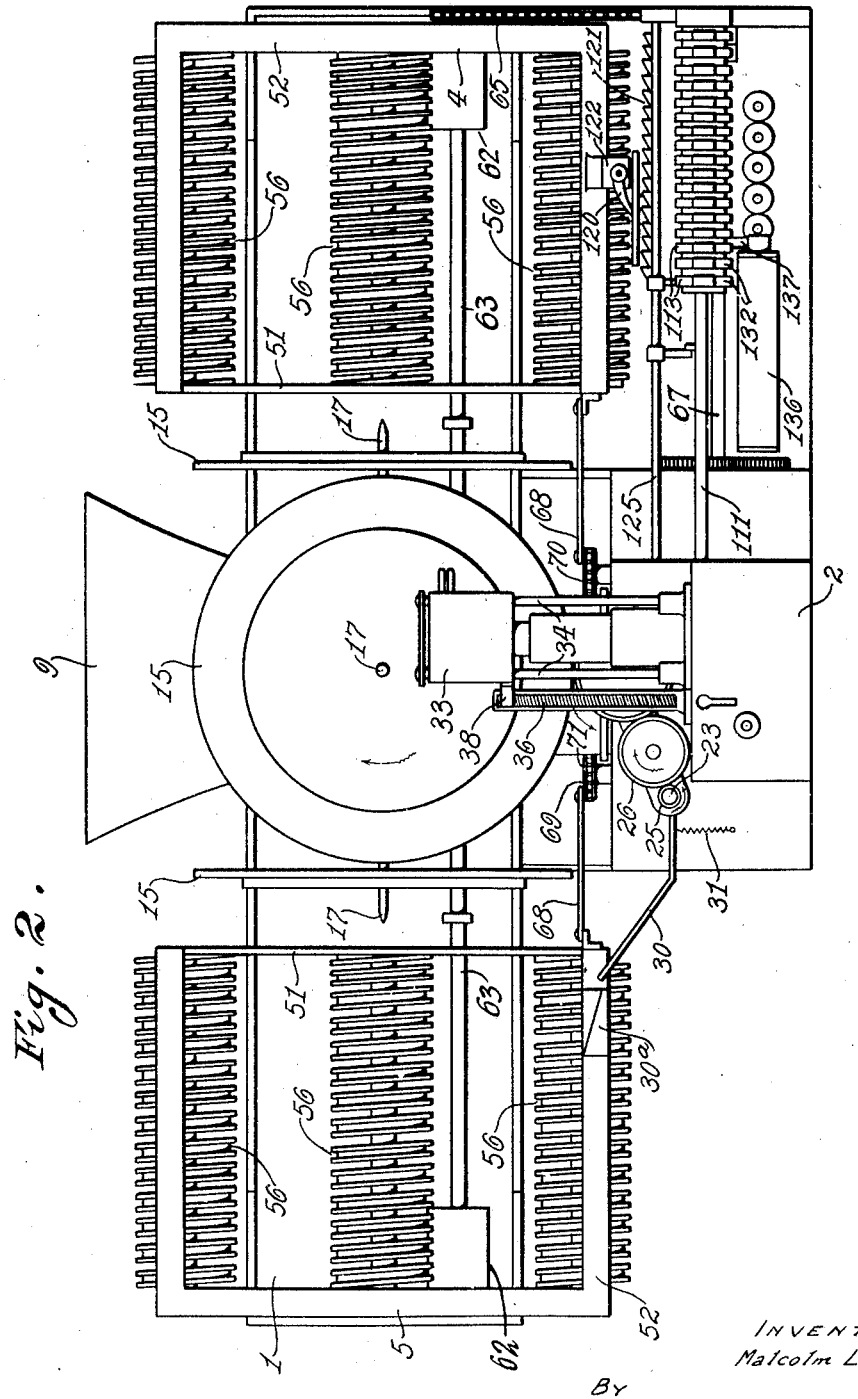

Sept. 16, 1924.
M. L. ORD
1,508,986
PHONOGRAPH
Filed July 27, 1922 11 Sheets-Sheet 3
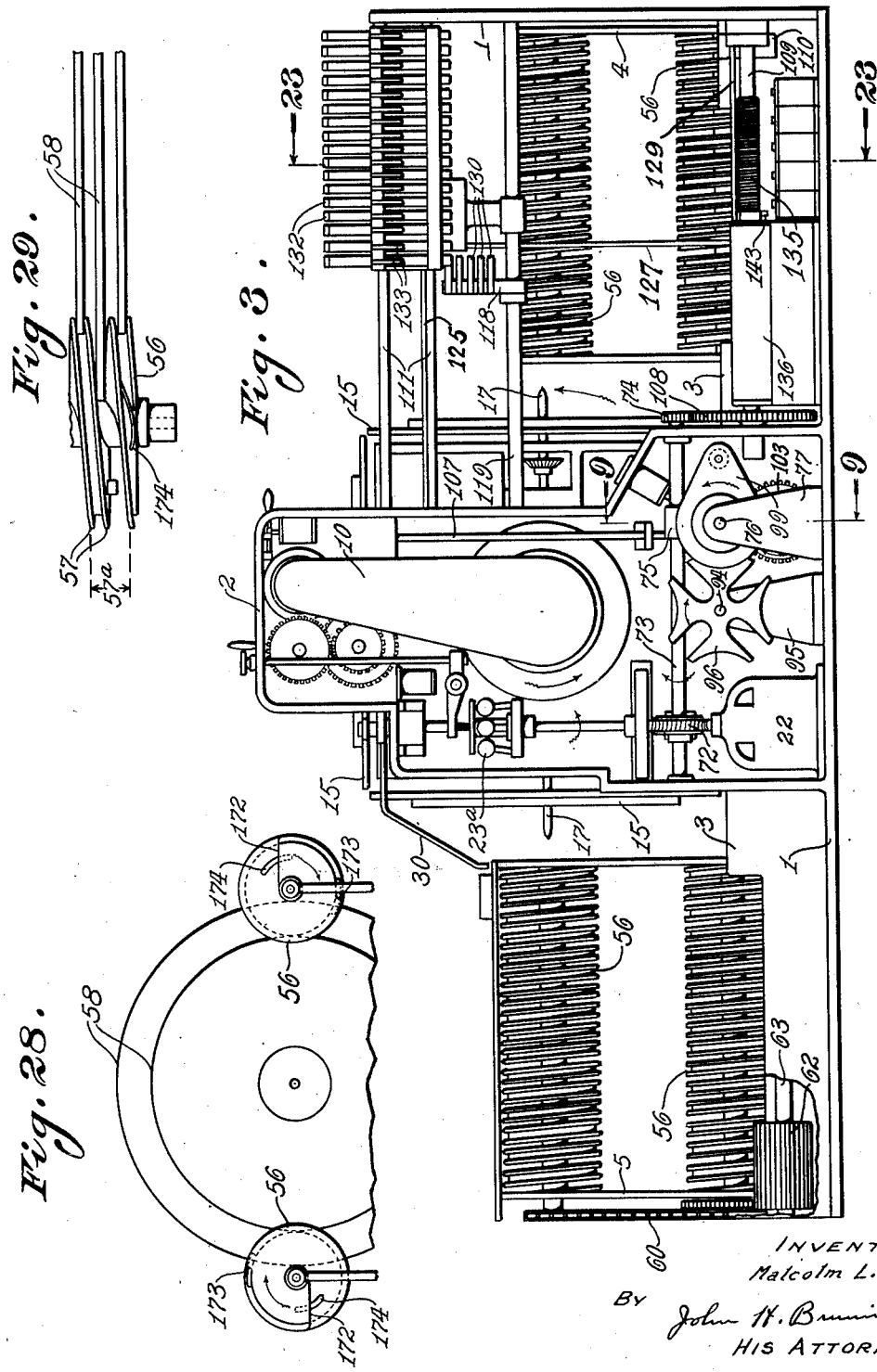
INVENTOR:
Malcolm L. Ord,
BY John H. Bruninga,
HIS ATTORNEY.

Sept. 16, 1924.
M. L. ORD
1,508,986
PHONOGRAPH
Filed July 27, 1922     11 Sheets-Sheet 4
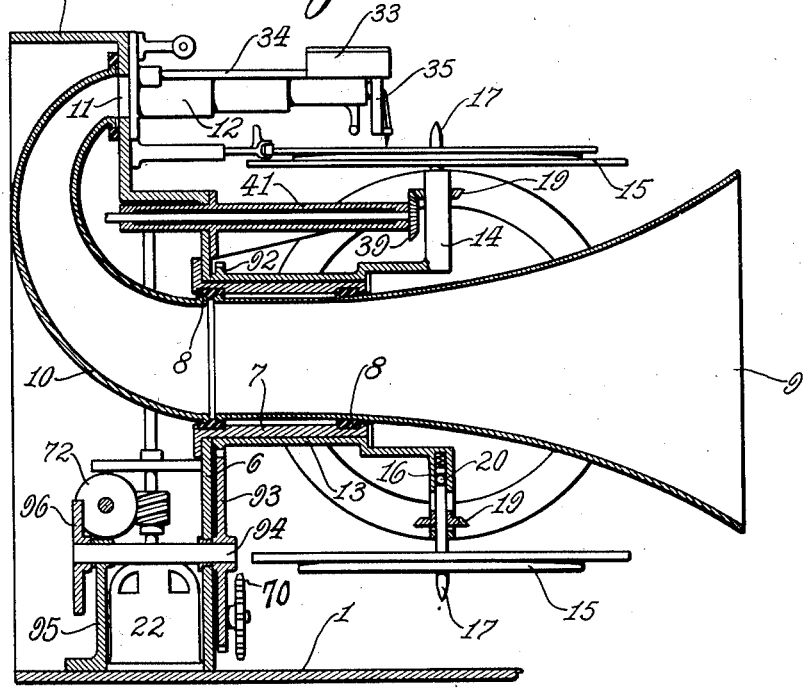
INVENTOR:
Malcolm L. Ord,
BY
John H. Bruninga,
HIS ATTORNEY.

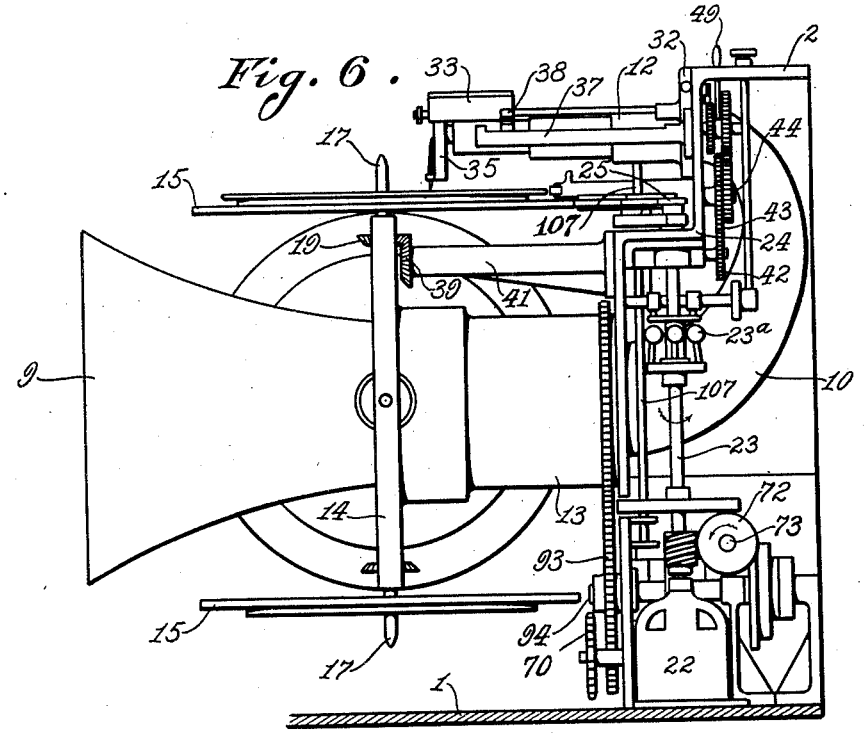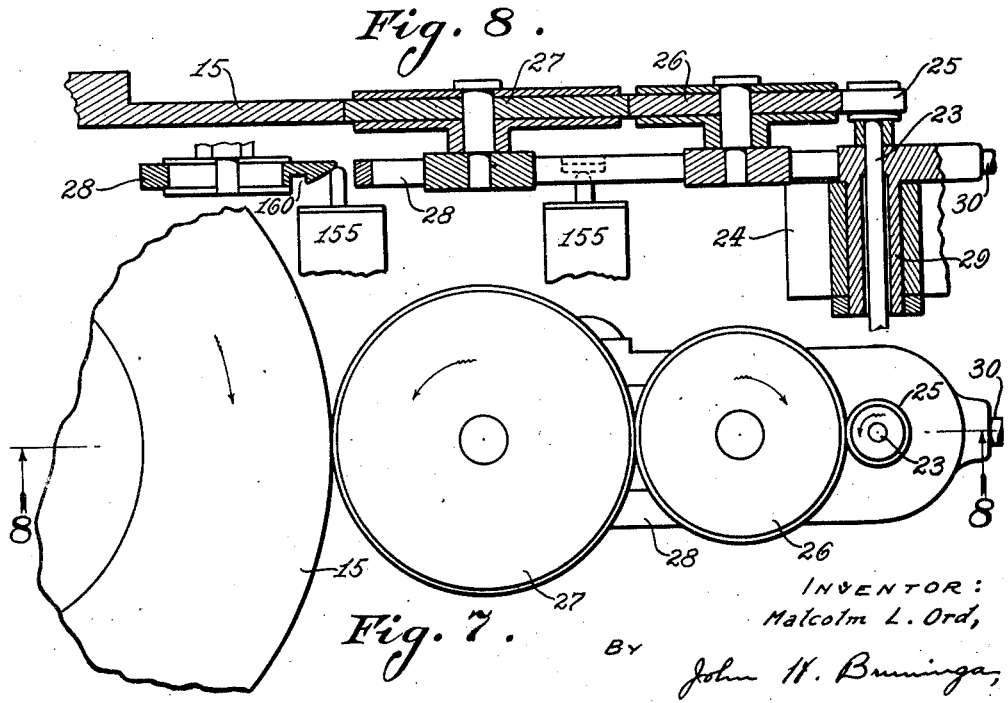

Sept. 16, 1924.

M. L. ORD

PHONOGRAPH

Filed July 27, 1922  11 Sheets-Sheet 6

1,508,986

INVENTOR:
Malcolm L. Ord,
By John W. Bruninga
His ATTORNEY.

Sept. 16, 1924.    1,508,986
M. L. ORD
PHONOGRAPH
Filed July 27, 1922    11 Sheets-Sheet 7
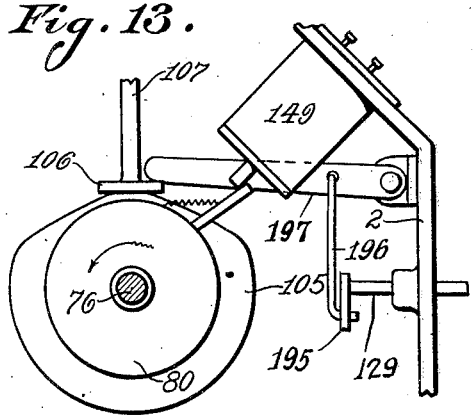
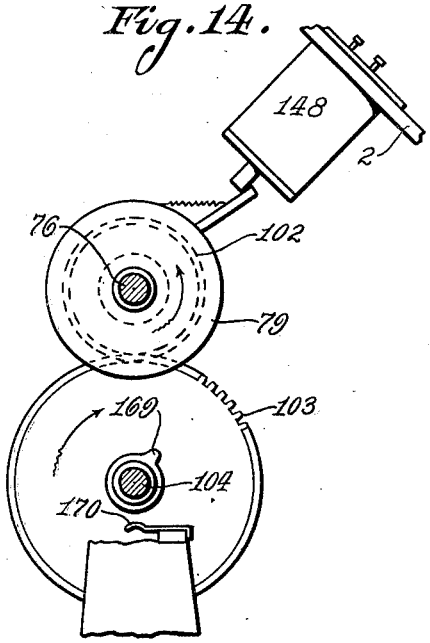
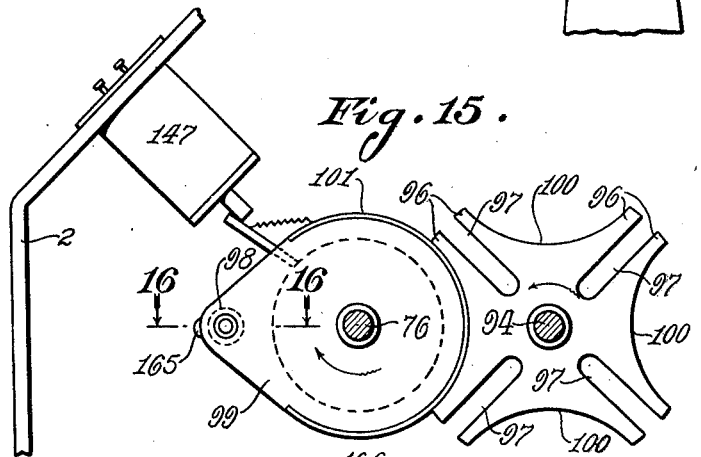
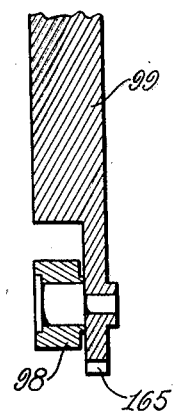
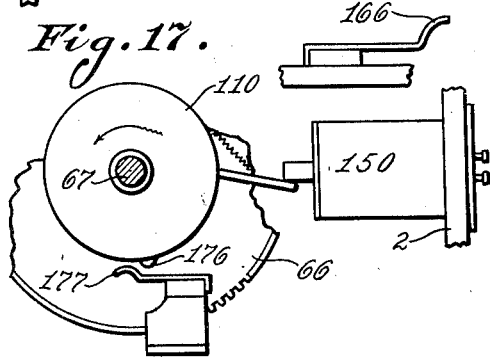
INVENTOR:
Malcolm L. Ord,
By John H. Bruninga,
HIS ATTORNEY.

Sept. 16, 1924.
M. L. ORD
PHONOGRAPH
Filed July 27, 1922   11 Sheets-Sheet 8
1,508,986
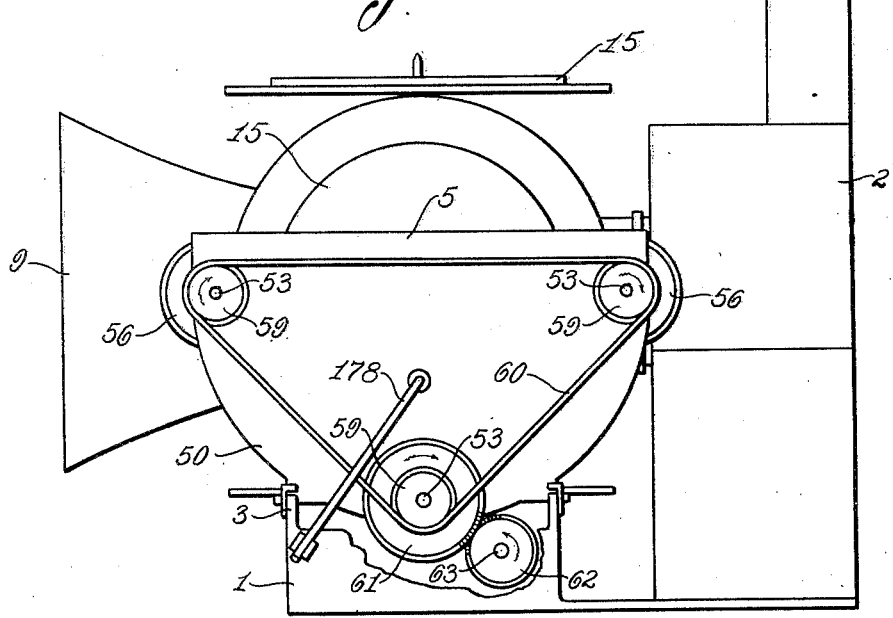
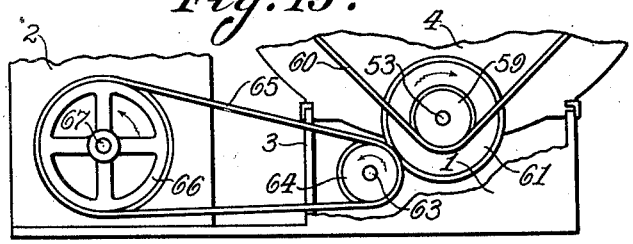
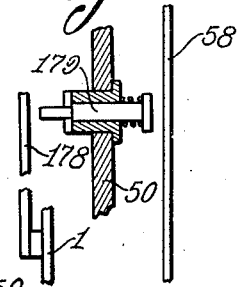
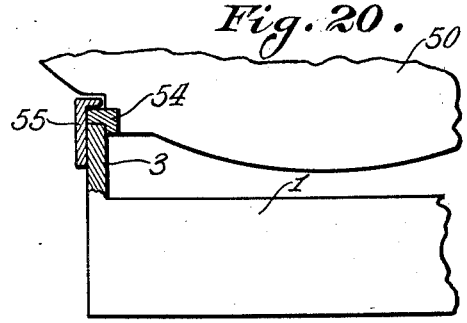
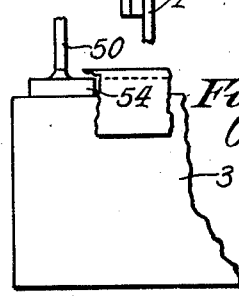
INVENTOR:
Malcolm L. Ord,
By John W. Bruninga,
HIS ATTORNEY.

Sept. 16, 1924.
M. L. ORD
PHONOGRAPH
Filed July 27, 1922   11 Sheets-Sheet 9
1,508,986
Fig. 23.
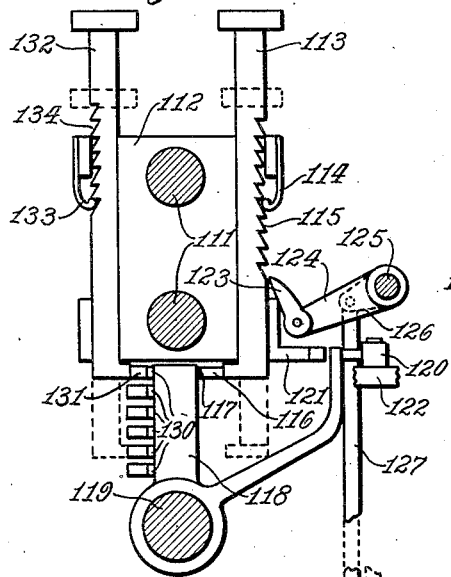
Fig. 24.
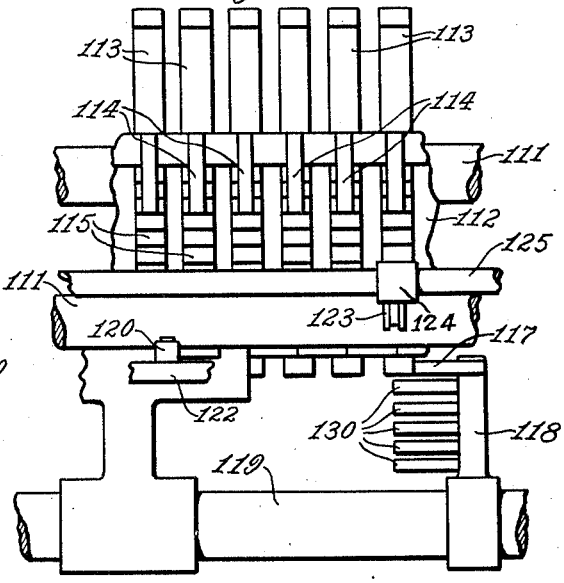
Fig. 25.
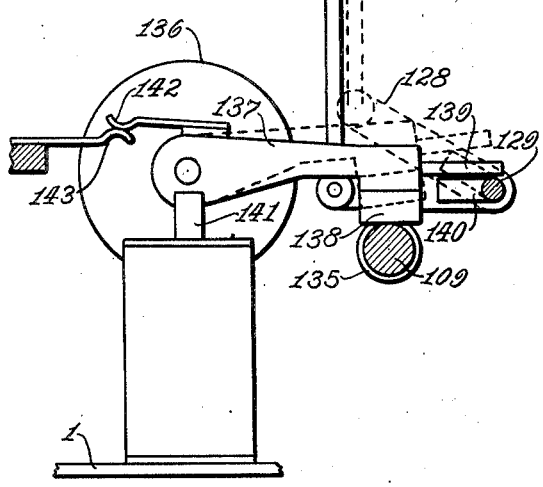
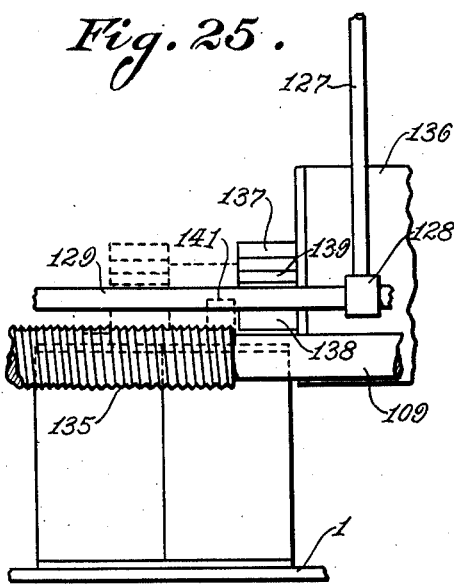
INVENTOR:
Malcolm L. Ord,
BY John H. Bruninga,
HIS ATTORNEY.

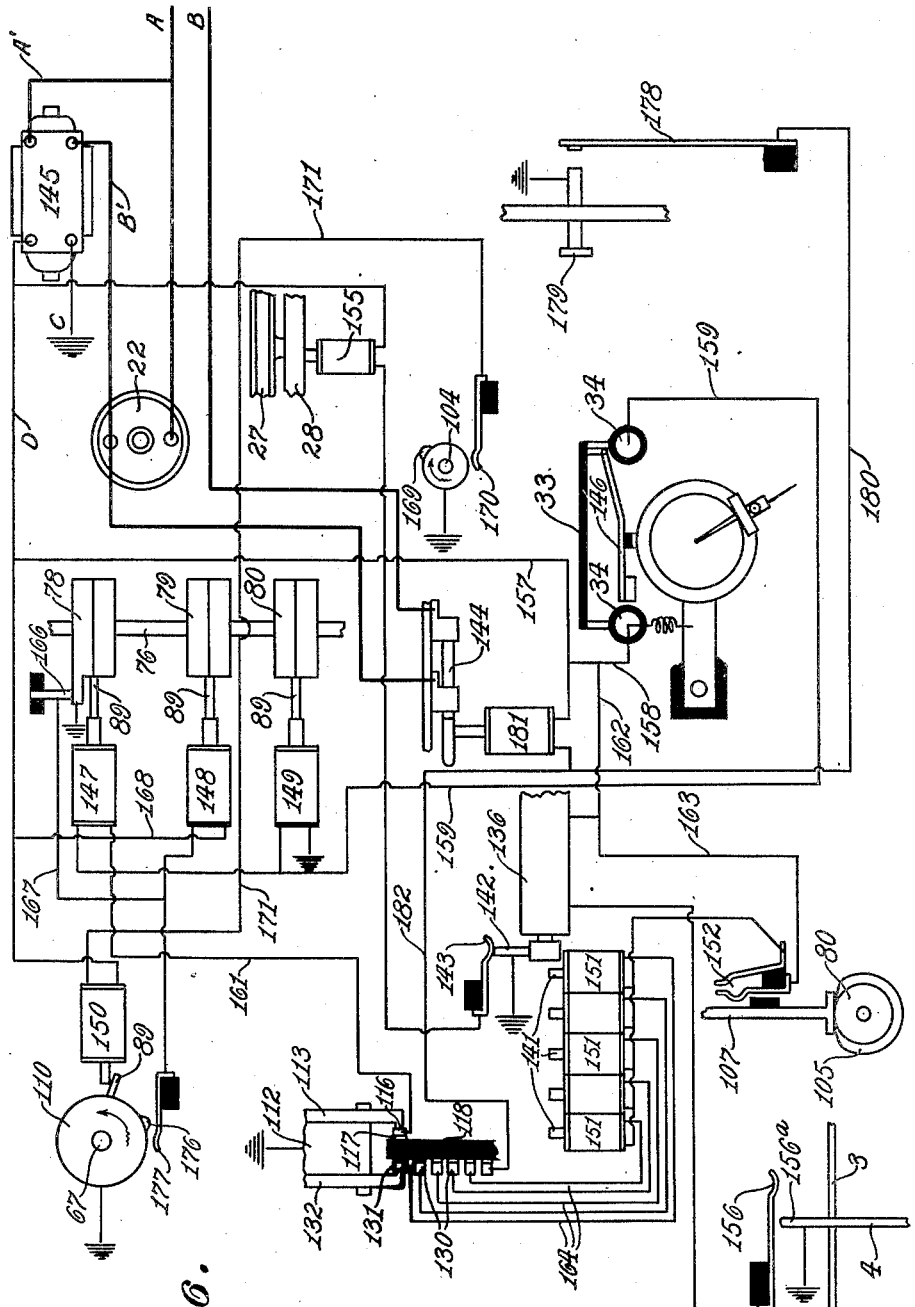

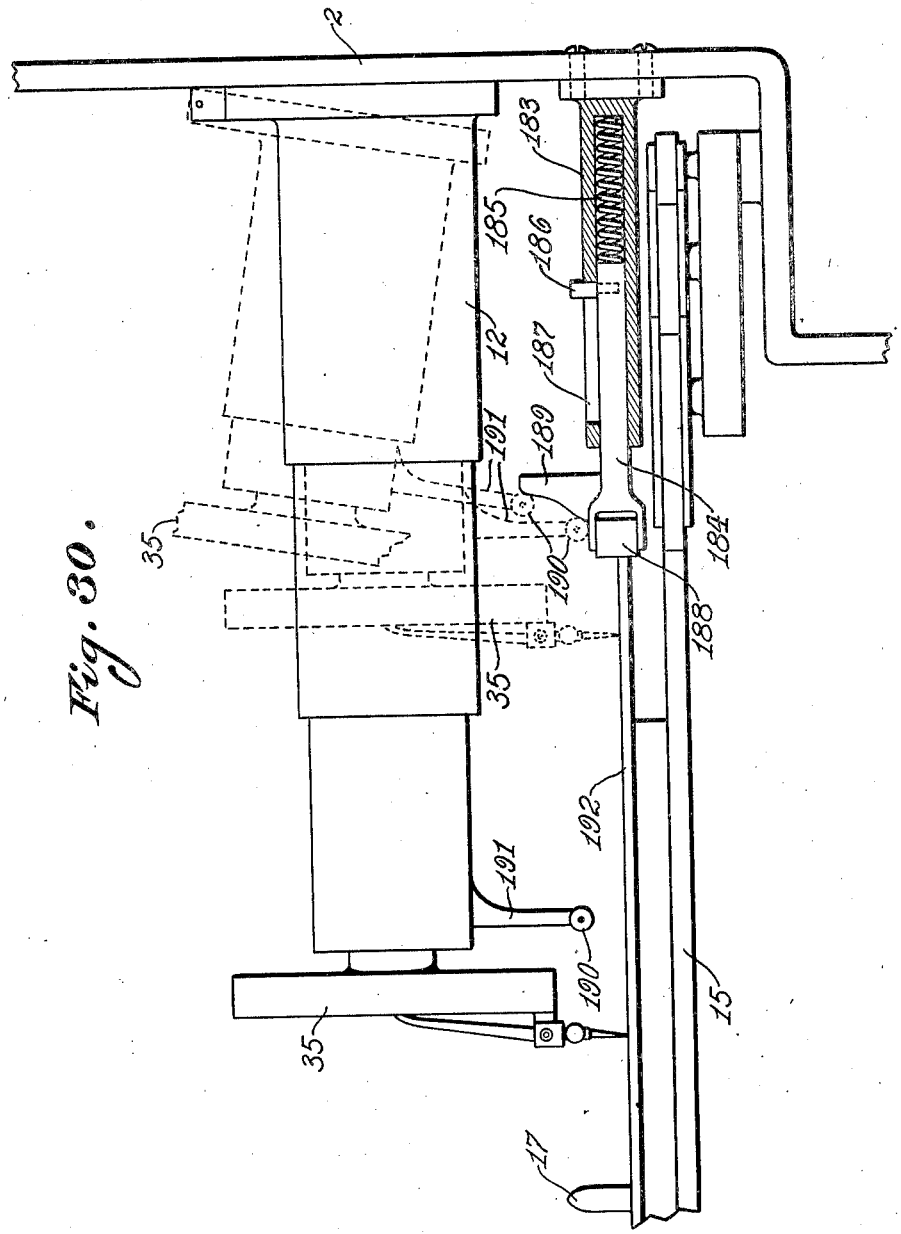

Patented Sept. 16, 1924.

1,508,986

UNITED STATES PATENT OFFICE.

MALCOLM L. ORD, OF COLORADO SPRINGS, COLORADO.

PHONOGRAPH.

Application filed July 27, 1922. Serial No. 577,944.

*To all whom it may concern:*

Be it known that I, MALCOLM L. ORD, a citizen of the United States, and residing at Colorado Springs, county of El Paso, Colorado, have invented the new and useful Improvement in Phonographs, of which the following is a specification.

This invention relates to phonographs, and more particularly to such instruments designed for playing successively a plurality of records.

One of the objects of this invention is to provide a machine which will automatically play a series of records in succession, the change of records being made automatically, without requiring the attention of the operator.

Another object of this invention is to provide such an automatic playing device in which more than one size of record may be used, and in which the different sized records may be used in any desired order, irrespective of their relative sizes.

Another object of this invention is to provide such an instrument which will successively play a series of records, and which may be adjusted to repeat any desired record a predetermined number of times.

Another object of this invention is to provide for playing records successively as above with a pause of any desired duration after any desired record.

Another object of this invention is to provide such an instrument for playing a series of records, in which the reproducing device may be automatically set to start a new record, and in which provision is made for operating the record-changing mechanism as soon as the playing of each record is completed.

Another object of this invention is to provide novel record carrying means and arrangements for automatically feeding the records from said carrying means to the playing mechanism and from the playing mechanism to receiving means after each record has been played.

Another object of this invention is to provide such an instrument which will automatically play a series of records and which when such series has been completed, will automatically stop.

Further objects will appear from the detail description taken in connection with the accompanying drawings, in which:

Figure 1 represents a view in front elevation of a machine embodying this invention;

Figure 2 represents a plan view of the same machine;

Figure 3 represents a rear elevation with certain parts removed to expose the mechanism;

Figure 4 is a section on line 4—4, Figure 1;

Figure 5 is an enlarged detail of Figure 4 showing the mounting of the turn-tables;

Figure 9:
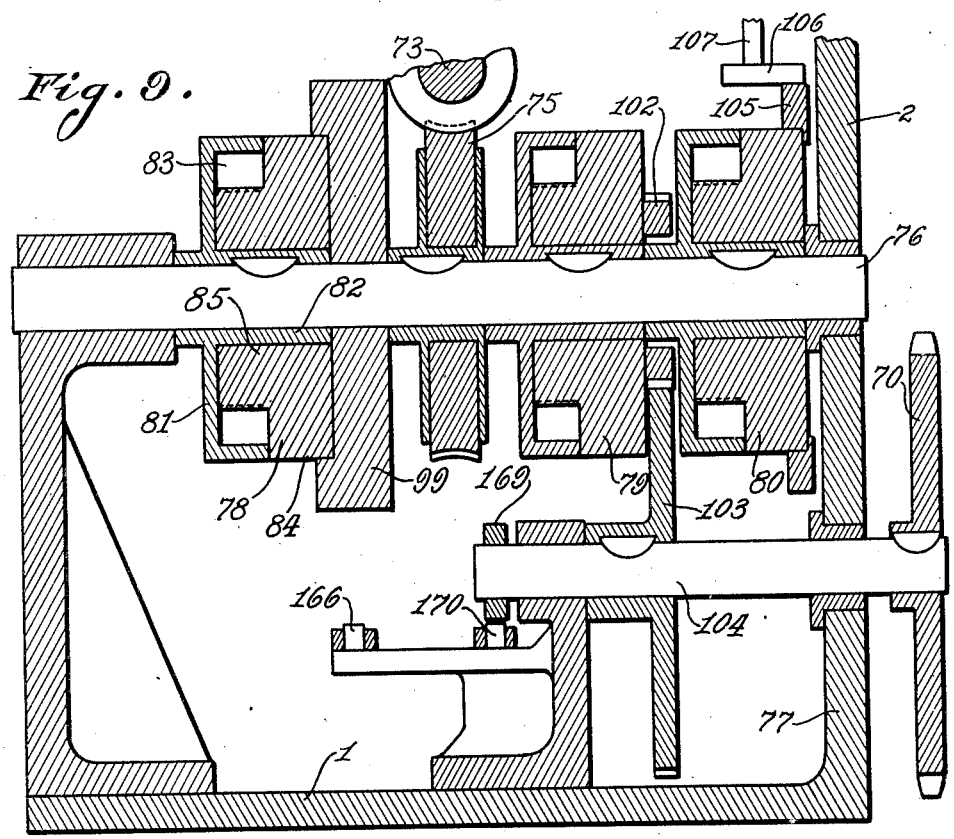
Figure 10:
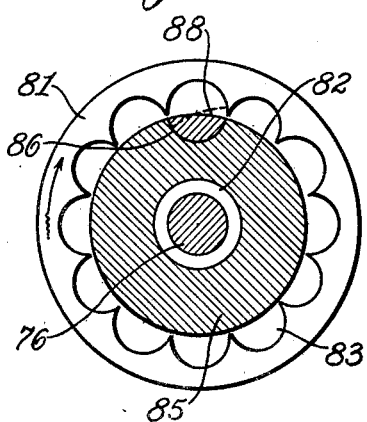
Figure 11:
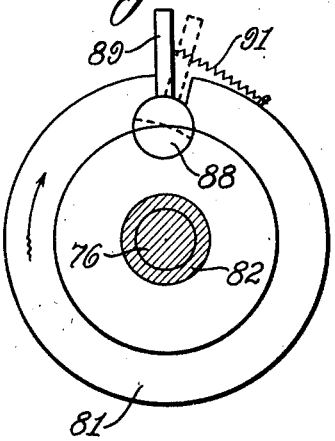
Figure 12:
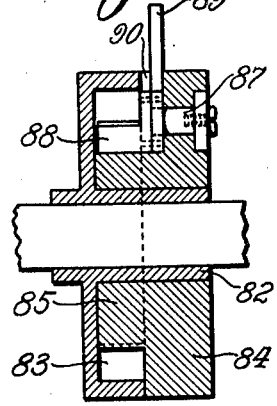

Figure 5ª is an enlarged detail showing the connections for driving the lead screw;

Figure 6 is a sectional view taken about a line 6—6, Figure 1;

Figure 7 is a plan view enlarged showing the connections for driving the turn-tables;

Figure 8 is a section on line 8—8, Figure 7;

Figure 9 is an enlarged sectional view taken on line 9—9, Figure 3;

Figures 10, 11 and 12 are detail views showing the operation of the clutches shown in Figure 9;

Figure 13 is a detail of the cam for elevating the sound arm;

Figure 14 is a detail of the driving mechanism for operating the record carriages;

Figure 15 is a detail of the mechanism for rotating the turn-tables in changing records;

Figure 16 is an enlarged detail section on line 16—16, Figure 15;

Figure 17 is a detail of the driving mechanism for the record feeding screws;

Figure 18 is a view from the right hand end of Figure 1 with certain parts removed so as to show the connections for driving the record feeding screws;

Figure 19 is a similar view from the left hand end of Figure 1;

Figures 20 and 21 are detail views showing the arrangements for mounting the record carriers;

Figure 22 is a detail of the stop mechanism for stopping the machine when all of the records have been played;

Figure 23 is a detail of the mechanisms for adjusting the number of repetitions of any record and the pause or pauses between repetitions or between records; this view is taken about on line 23—23, Figure 3;

Figure 24 is a side view of the mechanism taken in Figure 23;

Figure 25 is a detail of the pause adjusting mechanism and also the pause timing mechanism;

Figure 26 is a diagram of electrical connections;

Figure 27 is a detail showing the way in which the record feeding screws engage the records;

Figure 28 is a detail showing the arrangements for ejecting the records from the feeding screws;

Figure 29 is a detail showing how the record feeding screws accommodate records of different sizes; and Figure 30 is a detail of Figure 6 showing the arrangements for adjusting the reproducer to its proper starting position for any size record.

Referring to the accompanying drawing, 1 designates a frame or bed upon which the entire mechanism is mounted. This may be in the form of a suitable casting having suitable attachments for brackets and other supporting members for carrying the mechanism.

Mounted near the middle of the bed 1 is an upright bracket or sub-frame 2 upon which the playing mechanism proper is mounted. The bed 1 may have formed thereon or attached thereto two sets of rails 3 upon which the record carriages 4 and 5 are adapted to slide lengthwise on the bed 1 through a limited distance. The carriage 4 is arranged at the left hand end of the bed, Figure 1, and the records when inserted into the machine are placed into this carriage. After being fed to the playing mechanism and having been played thereby, each record is transferred to the carriage 5 for storage until all of the records have been played.

Playing mechanism.

Referring more particularly to Figures 1, 2, 4, 5 and 6, on the front wall 6 of the frame 2 is a sleeve 7. This is permanently mounted on the wall 6. Mounted within the sleeve 7 and suitably insulated therefrom by means of rubber or other resilient insulation 8 is the horn 9. The purpose of the insulation 8 is to deaden any noise or vibration which may be transmitted from the mechanism to the horn 9, and to isolate the amplifying chamber from any connection with the cabinet, such insulation 8 serving as the means of support for the horn 9. Connecting with the rear end of the horn 9 and supported at one end in the sleeve 7 and at the other on the upper portion of the bracket 2 is a sound tube 10. This tube is also suitably insulated from the metal parts and communicates with an aperture 11 in the upper wall of the frame 2, opposite which the sound arm 12 is mounted, so that the sound may be conducted from the sound arm 12 via the tube 10 to the horn 9, which terminates at the front of the instrument. Mounted for rotation on the outside of the sleeve 7 is a barrel 13 carrying at its forward end a frame 14 upon which the record playing turn-tables 15, four in number, are mounted. The frame 14 is provided with four radial arms 16, upon each of which is mounted a spindle 17 for carrying the turn-tables 15. Each arm 16 is bored radially to provide a bearing for the spindle 17 and has a window 18 through which this spindle passes, a small beveled gear 19 being mounted on the spindle 17 and within the window 18. This gear 19 is fixed to the spindle 17. The inner end of each spindle rests upon a steel ball 20 which is forced radially outward by a spring 21, the outward movement being limited by engagement of the gear 19 with the outer frame of the window 18.

Referring now to Figures 6, 7 and 8, a driving motor 22 is provided which drives the entire mechanism. The vertical shaft 23 of this motor extends upwardly passing through the shoulder 24 on the bracket 2 and terminating opposite the upper turn-table 15. This shaft is provided at its upper end with a friction wheel 25, adapted to drive through a series of similar friction wheels 26 and 27 the upper, or playing turn-table 15. The wheel 27 engages the edge of the table 15 for this purpose. The wheels 26 and 27 are adjustably mounted on the arm 28 pivoted on the shoulder 24 about the shaft 23. In order to provide such pivot, the arm 28 is provided with a sleeve 29 having a bearing in the shoulder 24 and in turn has a bearing for the shaft 23 as illustrated in Figure 8. The sleeve 29 has attached thereto an arm 30 (see also Figure 2) to which a spring 31 is attached in order to maintain the wheel 27 in engagement with the rim of the playing table. This drives the playing table in a suitable direction and through the agency of the governor 23ª, at the proper speed for playing a record Pivoted at 32 on the bracket 2 is the sound arm 12 comprising three telescopic sections. The outer section is supported upon a carriage 33 sliding on a pair of rods 34 which are mounted upon the base of the sound arm 12, so as to pivot therewith about the pivot 32. The reproducer 35 is suitably mounted on the end of the outer section. The construction is such that the telescopic sections of the sound arm 12 will extend themselves as the reproducer 35 is fed forwardly during the playing of the record and upon raising the sound arm 12 on the pivot 32 to an inclined position as hereinafter described, the carriage 33 will slide back by gravity along the rods 34, the sections of the sound arm telescoping during such movement. In this way, the reproducer may be returned by gravity to its starting position on the record.

In order to feed the reproducer forward at the proper rate during the playing of the record, a lead screw 36 is provided. This screw is rotatably mounted in the upper wall of the bracket 2 and in proper relation to the sound arm as illustrated in Figures 2 and 6. This screw may be provided with a housing 37 to protect the same from injury and to provide also a rigid bearing at the end thereof for the end of the screw. An arm 38 extends from the side of the carriage 33 and is provided with a half nut adapted to engage the screw 36 and which may be lifted out of engagement when the sound arm is raised for returning the reproducer to its starting position. For the purpose of driving the lead screw 36 the following mechanism is provided. A bevel gear 39 is mounted on the end of a shaft 40 having bearings in a bracket 41 suitably mounted on the frame 2 (see Figures 5$^a$ and 6). On the opposite end of the shaft 40 is a spur gear 42 adapted to mesh with a gear 43 by a stub shaft 44 also mounted on the frame 2. The stub shaft 44 carries another gear 45 of different diameter than the gear 43 but connected therewith. A pair of gears 46 and 47 of different diameters are mounted in spaced relation on the sleeve 48 slidably mounted upon but splined to the shank of the lead screw 36 where it comes through to the rear of the bracket 2. The gears 46 and 47 are adapted to mesh one at a time with the gears 43 and 45, respectively, so as to furnish a changeable gear ratio between the shaft 40 and the lead screw 36. This is for the purpose of changing the speed of rotation of the lead screw which has say one hundred threads per inch so as to change the rate of the reproducer 35 so as to correspond with the different pitch of the threads on different makes of records, some of which have one hundred threads per inch and some one hundred fifty. A lever 49 is provided for shifting the sleeve 48 in any well known manner so as to throw either pair of gears 46, 43, or 47, 45 into mesh with each other. As shown in Figure 6, the gear 39 is adapted to mesh with the gear 19 on the spindle 17 of the playing table. Thus the playing table through the gears 19 and 39 drives the shaft 41 which in turn through the gear train just described, drives the lead screw 36 at the required speed.

*The record carriage.*

Referring more particularly to Figures 1, 2, 3, 18, 19, 20, 21, 27, 28 and 29, the carriages 4 and 5 are of similar construction and operation, and a description of one will serve for both. Where differences actually occur, they will be specifically pointed out. Each carriage consists of an outer end plate 50 and an inner end frame 51 connected by a top frame 52 and a series of three shafts 53. The plates 50 and the frames 51 are each provided with a pair of shoes 54 adapted to slide upon the rails 3 of the bed (see Figure 20). A guard rail 55 may be provided for each rail 3 as shown. This is to prevent the carriage from being accidentally dislodged.

Each of the shafts 53 carries a record feeding screw, there being three such screws to each carriage. The structure of the feed screws 56 is illustrated in detail in Figure 29. Each screw is provided with a double thread, both threads having the same pitch but different depths. The thread of greater diameter is provided with flanges 57 adapted to receive therebetween a record 58 of small diameter (usually ten inches). The thread of small diameter lies between the convolutions of the thread of larger diameter, the latter forming flanges for the former. The screws 56 are arranged in triangular relation as illustrated in Figure 18 so that a disc record may be supported upon the three screws by setting the edge thereof in the corresponding screw thread on each record, the records of small diameter being set upon the thread of larger diameter, and vice versa, as illustrated in Figures 28 and 29. It will be readily understood that when the screws 56 on the same carriage are rotated in the same direction and at the same time, a record placed thereon, as above described, will roll with the turning of the screws in the direction of movement of the screw thread. In this way, all of the records which may be carried simultaneously and which may be resting upon the screw threads of large or small diameter, will be fed along the carriage by the simultaneous uniform rotation of the screws. In operation only one record of either ten inch or twelve inch diameter is to be placed within the double pitch distance shown at 57$^a$, Figure 29, suitable means for limiting the placement of the records being a part of the cabinet decking not shown.

Each of the shafts 53 is provided at one end thereof with a sprocket 59, and a chain 60 engages the three sprockets of each carriage so as to secure a simultaneous and uniform movement of the three record feeding screws thereof.

The lower shaft of each carriage is provided at the outer end thereof with a spur gear 61 to mesh with an elongated pinion 62. One of these gears 62 is mounted at each end of a shaft 63 running longitudinally of the bed 1. The shaft 63 is driven by means of a sprocket 64, a chain 65 and a sprocket 66 from the shaft 67 as illustrated in Figure 19. It will be understood that this drive is intermittent and takes place only when it is desired to feed a record as will be described hereinafter.

Each carriage is connected by a link 68 to one of a pair of sprockets 69 and 70 connected by a chain 71 (see Figure 2) and driven as will be hereinafter described. Upon rotation of the sprockets 69 and 70 through a half revolution from the position shown in Figure 2, both carriages 4 and 5 will be drawn inwardly toward the record changing mechanism which will be described hereinafter, and when these sprockets are rotated through a second half revolution, the carriages will be returned to their outer positions.

*Record changing mechanism.*

Referring to Figures 1, 2, 3 and 4, the motor 22 drives through a worm drive 72, a shaft 73 running cross-wise of the frame 2 as shown more particularly to Figure 3. The shaft 73 has bearings in the walls of the bracket 2, extending through one of said walls and carries at its protruding end a gear 74 which drives a train of gearing, the purpose of which will be hereinafter set forth. This shaft 73 also drives through a worm or spiral gear drive 75 a countershaft 76 having bearings in the bracket 77 suitably mounted upon the bed 1. The shaft 76 carries a series of three special clutches 78, 79 and 80. These are illustrated in detail in Figures 9 to 12 inclusive. Each of these clutches comprises an outer member 81 keyed to the shaft 76 and formed with a central sleeve 82. This member 81 is provided on its inner surface with a series of scalloped excavations 83 extending around the periphery thereof, as shown in Figure 10. Each clutch also has an inner member 84 rotatably mounted on the sleeve 82 and provided with an extension 85 lying within the scalloped section of the member 81. This extension 85 is provided with a single semi-circular excavation 86 corresponding to the excavations 83 of the member 81. Rotatably mounted in the member 84 by means of a short stud 87 having a bearing therein is a dog 88 having a portion adapted to lie within the excavation 86, and the outer surface of which portion is formed to provide a continuation of the outer surface of the extension 85.

The dog 88 is provided with an arm 89 extending through and protruding from the exterior of the member 81, as shown in Figures 11 and 12. The aperture 90 through which the arm 89 passes is adapted to provide a limited rocking movement for said arm, whereby the dog 88 may be rocked upon its pivot 87. The arm 89 is connected by a spring 91 to the member 81 as illustrated in Figure 11. The spring 91 tends to rock the dog to the position shown in dotted lines in Figure 11. When the member 81 is rotated in the direction of the arrow, Figure 11, and the arm 89 is in the full line position shown in Figure 11, the edges of the scallops 83 will pass over said dog and leave the member 84 stationary while the member 81 revolves. Should the arm 89 be moved to the dotted line position, Figure 1, the dog 88 will engage one of the scallops 83 in such a way as to lock the members 81 and 84 together, so that the member 84 will be carried around with the member 81. It will, therefore, be evident that so long as the spring 91 is free to move the arm 89 to the dotted line position, Figure 11, the members 81 and 82 will be locked together and will rotate together in the direction of the arrow, Figure 11. It will also be evident that an obstruction placed in the path of the arm 81 will rock that arm to the full line position, Figure 11, so as to release the member 84 and hold it stationary while the member 81 continues to revolve.

The three clutches 78, 79 and 80 control respectively the rotation of the barrel 13 for rotating the turn-tables in changing records, the inward and outward travel of the record carriages, and the raising and lowering of the sound arm.

The rotation of the barrel 13 is accomplished as follows: This barrel is equipped at its inner end with a gear 92 adapted to mesh with a gear 93 carried by a shaft 94 in bearings in the front wall of the bracket 2 and the bracket 95. This shaft carries at its rear end the star wheel 96 of the so-called Geneva movement, illustrated in Figure 15. The star wheel 96 is provided with a series of radial slots 97 adapted to receive a cam roller 98 suitably mounted on the driving member 99 of the Geneva movement. The wheel 96 is also provided with concave circular bearing surfaces 100 adapted to engage the cylindrical surface 101 of the member 99. The action of this movement is well known. The member 99 being mounted on the member 84 of the clutch 78 is driven by the shaft 76 when ever said clutch is properly operated. Upon rotation of the member 99 in the direction indicated by the arrow, Figure 15, the star wheel 96 will remain stationary so long as the surface 100 is in engagement with the surface 101. As the rotation of the member 99 continues, the cam roller 98 will enter the slot 97 so that upon further movement, the star wheel 96 will be turned through one quarter of a revolution before the roller 98 again emerges from the slot 97. The surface 101 is interrupted for a suitable distance opposite the roller 98 so as to allow for this movement of the star wheel. It will be understood, therefore, that every time the member 99 is turned through one revolution, the star wheel 96 and its shaft 94 will be turned through one quarter revolution. Each one-quarter rotation of the shaft 94 through the equal gears 93 and 92 will rotate the barrel 13 through one quarter revolution so as to bring another turn-table 15 into the upper or playing position, and by means of surfaces 100 and 101 remain locked in this position until unlocked by another revolution of the member 99.

The clutch 79 carries a pinion 102 (see Figure 9) meshing with a gear 103 on a counter shaft 104 having bearings in the bracket 77 and carrying at its inward end the sprocket 70. As previously described, the sprocket 70 is connected by a chain 71, Figure 2, to a similar sprocket 69 and these two working in unison operate to reciprocate the record carriages.

The clutch 80 carries a cam 105 engaging a follower 106 on the lower end of a stem 107, see Figures 6 and 9, passing upwardly through guides suitably mounted on the bracket 2 to engagement with the sound arm 12. As will be noted from Figure 13 the operation of the cam 105 raises the stem 107 and after a complete revolution thereof, it again lowers to its original position.

The gear 74 on the shaft 73 (see Figure 3) engages a gear 108 on a shaft 109 extending longitudinally of the base 1 and having bearings in the bracket 2 and the end wall of the base 1. This shaft carries a clutch 110 similar in construction to the clutches 78, 79 and 80 and adapted to drive intermittently the sprocket 66 on the shaft 67. The sprocket 66 drives the shaft 63 (see Fig. 19) which drives the record feeding screws as previously described.

*Repeating mechanism.*

Referring to Figures 1, 2, 3, 23, and 24, provision is made for repeating any desired record a predetermined number of times. Suitably mounted in the bracket 2 and the end wall of the base 1 is a pair of guide rails 111 upon which a carriage 112 is adapted to slide longitudinally of the frame and parallel to the reciprocating movement of one of the record carriages. Slidably mounted on the carriage 112 is a series of bars 113. These bars are mounted for vertical sliding movement on the carriage and are retained in adjusted position by a spring pawl 114 engaging a series of notches 115 in the bar. Each bar 113 carries at its lower end an electrical contact 116 adapted to engage a contact 117 mounted on an insulated support 118 carried by a supporting bar 119 mounted on the frame 1 and the bracket 2 as shown, more clearly in Figure 3.

The contacts 116 and 117 are so connected that when disengaged the opening of the circuit involved will prevent certain operations for changing records as will be hereinafter more fully described. When the contacts 116 and 117 are opened, the changing of records cannot take place and, therefore, the same record will remain in playing position. The bars 113 are the same in number as the record capacity of the record carriages, there being one record for each pitch distance 57ª, Figure 29, as previously pointed out. That is, there is one of these bars for each record. The bars are mounted side by side on the carriage 112 which is arranged to slide along the rails 111 being fed forward at each movement of the carriage 4 by a pawl 120 adapted to engage a ratchet 121 on the side of the carriage 112. The pawl 120 is mounted on the bracket 122 on the carriage 4 so that each reciprocation of said carriage will feed the carriage 112 forward or to the left, Figure 2, one notch. By this movement, as each record is fed to the playing mechanism, the corresponding bar 113 will be positioned opposite the contact 117 so as to close or open the circuit through said contact as the bars 113 are raised or lowered.

If the bar 113 be depressed from the full line position of Figure 23 to such a position, for instance, as shown in dotted lines in this figure, the contact between contacts 116 and 117 will be broken. The bar 113 will be held in any depressed position by the pawl 114 engaging the ratchet 115. A second pawl 123 mounted on an arm 124 on a rock shaft 125 is adapted to engage the teeth of the ratchet 115. Connected to an arm 126 on the rock shaft 125 is a vertically reciprocating rod 127 attached at its lower end to a rocking arm 128 on another rock shaft 129. The rock shaft 129 is adapted to be rocked at each operation of the playing mechanism, so as to raise the rod 127, thereby rocking the shaft 125 and raising the pawl 123 which, in turn, raises the bar 113 one notch of the ratchet 115. The mechanism for operating the rock shaft 129 is illustrated in Figure 13. A crank 195 on the shaft 129 is connected by a link 196 to a lever 197 pivoted at one end on the bracket 2 and resting at the other on the follower 106, so that at every rise of the rod 107 the shaft 129 will be rocked so as to operate the rod 127. It will be readily understood that the number of operations of the rod 127 required to raise the rod 113 to its full line position, Figure 23, is equal to the number of notches which it was originally depressed, and this also is the number of repetitions of the given record which will be executed before the contacts 116 and 117 are closed so as to allow operation of the record changing mechanism.

Pause timing mechanism.

Provision is also made for adjusting the length of the pause between the end of one record and the beginning of the following one. Mounted on the support 118 is a series of contacts 130 adapted for engagement with a contact 131 on the lower end of a bar 132 slidably mounted in the carriage 112 in a manner similar to that just described for the bar 113. A spring pawl 133 engaging the corresponding ratchet 134 is adapted, however, to locate the contact 131 opposite one of the contacts 130 when the bar 132 is manually depressed, so that in any position of the bar 132 the contact 131 will contact with one or the other of the contacts 130. The contacts 130 control the pause timing circuits in order to determine the length of pause between the end of one record and the beginning of the next, in accordance with the distance that the bar 132 is depressed as will be hereinafter more fully described.

The shaft 109 is driven through the gears 108 and 74, as previously described. This shaft runs continuously. This shaft carries a screw thread 135 extending over a portion of its length. Mounted adjacent the shaft 109 is an elongated solenoid 136 which is constructed so that upon exciting its windings, it will project the left hand end, Figure 25, of its core or plunger forwardly from the solenoid. This end of the plunger carries an arm 137 equipped with an edge or half nut element 138 adapted to engage the thread 135. The arm 137 is equipped with an extension 139 adapted to be engaged by a wing 140 on the shaft 139 (see Figure 23) and extending along said rock shaft for a distance equal to and opposite the screw thread 135. It will be seen that upon operation of the rock shaft 125, the wing 140 will engage the extension 139 to raise the arm 137, thereby permitting the solenoid to project its plunger so as to carry the same forwardly the required distance as controlled by a series of solenoid operated stops 141 to be hereinafter described. The nut 138 may then be lowered upon the thread 136 which, being in continuous operation will operate to feed the plunger back again into the solenoid, the time required for the complete movement being proportional to the distance along the thread 135 through which the plunger was originally projected.

The arm 137 also carries an electrical contact 142 movable with the arm 137 and adapted to engage a stationary contact 143 when the plunger has been completely retracted. These contacts control the operating circuits so that the operation of the mechanism is delayed until this plunger has been projected and retracted. Thus by controlling the extent of the projection of the plunger of the solenoid 136, the length of the pause between records can be controlled. There is a bar 132 for each record so that the pause following each record may be individually controlled.

Controlling circuits.

The controlling electrical circuits are shown in Figure 26. The main supply circuit enters at A and B. This circuit usually carries about 110 volts and must be reduced where it is carried to the operating parts of the mechanism in order to insure safety to the operator. The motor 22 may, however, be fed with full voltage and for this purpose the line A may be carried directly to the motor as shown in Figure 26 and the line B, after passing through the main switch 144 which may be suitably mounted in any part of the apparatus, passes to the other motor terminal. The lines A' and B' carry the line voltage to the primary of the step-down transformer 145.

One side of the secondary of the transformer is grounded at C. This may be accomplished by connecting this wire to any part of the frame. All of the other apparatus may be connected in circuit by connecting one terminal to the line D and the other to the ground.

The carriage 33 is equipped with a contacting device adapted to complete the circuit between the rods 34, these rods being insulated from each other and from the frame by suitable insulating supports. This contacting device is arranged to operate at the completion of the playing of each record. As contacting devices of this kind are well known in the art, no detail description of the same will be required.

This contacting device 146 operates to close the circuit between the two rods 34. This may be done in any manner well known in the art. The clutches 78, 79, 80 and 110, previously described, are each provided with a solenoid 147, 148, 149 and 150, respectively. These solenoids are arranged to retract their cores when excited and are so positioned relatively to their respective clutches so that each core will be normally positioned in the path of the arm 89 of the clutch. Upon exciting any one of these solenoids, it will retract its core so as to release the arm 89, thereby allowing the clutch to engage to drive the appropriate mechanism. Upon opening the solenoid circuit, the core will again be projected by a spring (not shown) into the path of the arm 89 and the clutch will be thrown out of action.

The solenoid 136, as previously described, is arranged to project its core upon being excited. Arranged in the path of this core is a series of solenoids 151 uniformly spaced along the path of said core, the nearest one being closely adjacent the innermost position of the core. Each solenoid 151 is equipped with a plunger 141 arranged normally to lie almost wholly within the solenoid. When the solenoid is excited, this plunger moves to a position such that one end thereof projects a short distance above the solenoid and in the path of the plunger of the solenoid 136 so as to arrest the movement of said core. The purpose of these solenoids is to time the pause between records by determining the extent of travel of the core of the solenoid 136 before it is retracted by the screw thread 135. Each of these solenoids is electrically connected with one of the contacts 130 of the pause time-setting device shown in Figure 23 so that by depressing the bar 132 a proper distance the operator may select a contact 130 connecting the appropriate solenoid 151 into circuit to limit the travel of the contact 142 so as to make the desired pause. The circuit to the solenoids 151 is controlled by a spring contact switch 152 which is closed every time the stem 107 is raised to raise the sound arm as indicated in Figure 26.

The core of the solenoid 136 carries a contact 142 adapted to contact with a stationary contact 143 when said core has been completely retracted. This establishes a circuit through the solenoid 155 which is adapted to release the arm 28 so as to permit the driving wheel 27 to engage the playing table 15. This operates to start the playing of a record at the end of the predetermined pause.

A contact 156 arranged to be closed upon completion of the movement of the reproducer to starting position as will be hereinafter more fully described, controls the circuit through the solenoid 136.

*Sequence of operations.*

In order to describe the sequence of operations, we will assume as a starting point a time of completing the playing of a record. We will assume that the bar 113 and the pause timing bar 132 have been previously set for the desired point, where neither pause nor repeat are desired. Upon completion of the playing of the record, the contacting device 146 will close so as to establish a circuit as follows: From the line D via the conductors 157 and 158 to one of the rods 34, through the contacting device 146, to the other rod 34, thence via conductor 159 to the solenoids 149 and 147. One terminal of the solenoid 149 being grounded, this solenoid will immediately be excited so as to retract its core, thereby releasing the arm 89 of the clutch 80. This clutch will, therefore, be thrown into engagement so as to operate the cam 105 to raise the stem 107, which, in turn, elevates the sound arm 12. The reproducer will thereupon return by gravity to its starting position. The contact at 146 being momentary, since the reproducer is immediately raised so as to release it from the record, the circuit to the solenoids 149 and 147 will again be opened so as to release the plungers. This means that the clutches 80 and 78 will operate through only one revolution since the arms 89 will again be stopped at the end of one revolution, and the clutches thrown out of engagement. Consequently, the sound arm will simply be raised and held in raised position for a space of time sufficient to allow the reproducer to return to starting position and to allow the carrier 14 to bring a new record into playing position and will, thereafter again be lowered to the new record.

The advance of the carriage 5 causes the arm 30ª, Figures 1 and 2, to move the arm 30 in such a manner as to disengage the wheel 27 from the playing table. The arm 28 is provided with a notch 160 adapted to engage the spring-pressed plunger of the solenoid 155 when the arm is retracted as illustrated in Figure 8. The arm 28 will, therefore, be held in retracted position until the solenoid 155 is excited.

If we assume that the bar 113 has been set for a number of repetitions, the contacts 116 and 117 will be open. Since one terminal of the solenoid 147 is connected by the conductor 161 to the contact 116, this solenoid cannot be excited so long as the contacts 116 and 117 are out of engagement. Accordingly the clutch 78 will not be operated until these contacts have again been closed.

It is also assumed that the bar 132 was set for a given length of pause. This means that the contact 131 is moved into engagement with a certain one of the contacts 130. It will be noted that when the stem 107 is raised, the switch 152 will be closed, thereby establishing a circuit from the line D via conductors 157, 158, 162 and 163 and the switch 152 to the solenoids 151. One of the conductors 164 connects each of the solenoids 151 to one of the contacts 130. It will be evident, therefore, that upon closing of the switch 152 by raising the stem 107, a circuit will be completed through that one of the solenoids 151 connected to the contact 130 with which the contact 131 is in engagement. The solenoid 151 thus selected will thereupon project its plunger 141 into the path of the core of the solenoid 136. While the switch 152 is closed, the advance of the carriage 4 carrying the contact point 156ª closes the circuit at 156 to the solenoid 136, thereby exciting the solenoid 136 which will project its core forward until arrested by the selected stop 141, after which by appropriate operation of the mechanism shown in Figure 23 and previously described, the nut 138 will be lowered into engagement with the screw thread 135. This thread is in continuous rotation, so the retraction of the core of the solenoid 136 will begin immediately. The time required to fully retract said core will depend upon the distance it is required to travel as determined by the selection of the stop 141. Upon complete retraction of the core of the solenoid 136, the contact 142 will engage the contact 143 so as to close the circuit of the solenoid 155. This solenoid will retract its plunger, thereby releasing the arm 128 so as to permit the spring 31 to move the wheel 27 into engagement with the playing table of the record.

The record will now be played through in the ordinary manner, upon completion of which the contacting device 146 will again operate with a repetition of the results just described so long as the contacts 116 and 117 remain open. As previously described, however, each operation of the stem 107 causes an operation of the rod 127 and of the pawl 123 raising the bar 113 one notch at each operation. It will be understood, therefore, that the playing of the same record will be repeated as many times as required to return the bar 113 to the full line position, Figure 23, by repeated operation of the pawl 123. As soon as the contacts 116 and 117 are again brought into engagement, the circuits are set for an operation of the record changing mechanism.

If the contacts 116 and 117 are closed when the device 146 operates, a circuit through the solenoid 147 will be established momentarily. This solenoid will thereupon retract its core releasing the arm 89, so as to permit engagement of the clutch 78 through one revolution of the shaft 76. The rotation of the clutch 78 through one revolution will cause rotation of the shaft 94 through one fourth of a revolution through the agency of the Geneva movement illustrated in Figure 15, as previously described. The shaft 94 operating through the gears 93 and 92 will turn the barrel 13 through one-fourth of a revolution so as to bring a new turntable 15 to the innermost position. Previous to this movement a new record has been fed to the table 15 which is now moved into playing position. The member 99 of the Geneva movement carries a contact 165 adapted to contact with a stationary contact 166 just after the completion of the movement of the barrel 13, as will be clear from an examination of Figure 15. As shown in Figure 26, the contact 166 is connected by a conductor 167 to the solenoid 148 controlling the clutch 79. The other terminal of this solenoid is connected by a conductor 168 to the line D. A circuit through the solenoid 148 is, therefore, established momentarily when the contacts 165 and 166 come together. Closing the circuit to the solenoid 148 will result in an operation of the clutch 79 in a manner similar to that described for the other clutches so as to rotate the shaft 104 through one-half of a revolution, the gears 101 and 103 bearing the speed ratio of 1 to 2. This will result in a half revolution of the sprockets 70 and 69 so that the carriages 4 and 5 will be drawn inwardly toward the tables 15 facing the same. The carriage 4 will be suitably supplied with records, one of which is located at the left hand end, Figure 2, of said carriage and ready for discharge therefrom. The inward movement of this carriage will engage the spindle 17 in the central hole in the record. Just before the completion of the half revolution of the shaft 104, the contact member 169 carried on said shaft makes contact with a stationary contact 170 momentarily. This closes the circuit through a conductor 171 leading to one terminal of the solenoid 150, the other terminal of which is connected to the line D. The solenoid 150 controls the operation of the clutch 110 in a similar manner to that described for the other clutches. Closing of the contacts 169 and 170 will, therefore, result in one revolution of the shaft 67 which drives the record feeding screws 56 as previously described. The gear ratio is such that one revolution of the clutch 110 will result in one revolution of the feeding screws.

The feed screws 56 on the carriage 4 are equipped with record ejecting means at their inner ends as shown in Figures 28 and 29. The end of the thread is cut off along a substantially radial line as shown at 172 and 173. Just behind this cut-off portion and opposite the terminus thereof a spring 174 is mounted on each screw, similar springs being mounted on both the large and small threads. Te purpose of this spring is to force the record from the end of the screw as soon as the rotation of the screw will permit the record to pass the edge 172. Thus, after the carriage 4 has been drawn inwardly so as to engage the spindle 17 in the center hole of the record, the solenoid 150 is actuated to cause one revolution of the feed screws so as to eject the end record therefrom, leaving it on the spindle 17. Similarly the ends of the feed screws 56 on the carriage 5 are arranged to take up the records from the table 15 facing that carriage. For this purpose, the threads are also provided with cut-off edges 175 which are presented to the record in the position illustrated in Figure 27. One revolution of each of the screws 56 will thereupon engage the record in the appropriate thread of the screw, by means of the depressing action of the spring 21 in the case of twelve inch records to overcome the difference in the pitch lead of the record screw. In the case of ten inch records, the carriage 5 advances to within exact receiving distance in which case, the spring 21 is not in operation. The screw then will feed it away from the table 15. Upon completion of one revolution of the shaft 67 and the consequent transfer of records by rotation of the screws 56, a contact 176 is arranged to make momentary contact with a stationary contact 177 (Figure 26). This again closes the circuit of the solenoid 148 resulting in another half revolution of the sprockets 69 and 70 and the return of the carriages 4 and 5 to their outermost positions. Upon completion of such movement, the carriage 4 has delivered one record to one of the vertical tables 15 and the carriage 5 has received a record from the opposite table 15.

By the time these operations have taken place, the cam 105 has made a complete revolution so that the reproducer will be lowered to the record, the contact 156 closed and subsequent operations of the pause timing devices will take place as previously described.

Mounted on but insulated from the frame 1 of the carriage 5 is an arm 178 (see Figures 18 and 22). This arm is adapted to contact with a spring operated plunger 179 mounted in the end plate 50 and arranged to be engaged by a record 58 when the same reaches the end of its travel toward the outer end of the carriage 5. This is a safety device to prevent feeding of the records too far on the carriage. The arm 178 is connected by a conductor 180 (Figure 26) to the solenoid 181, the other terminal of which is connected by the conductor 157 to the line D. Closing the contact 178 causes the solenoid 181 to retract its core which is connected to the handle to the main switch 144 so as to open that switch upon retraction thereby stopping all operations of the instrument. The solenoid 181 is also connected by a conductor 182 to the lowermost of the contacts 130 so that by depressing any one of the bars 132 to its lowermost position, the operation of the instrument may be stopped after completion of the playing of any desired record.

Mounted on the bracket 2 is an arm 183 having slidably mounted therein a plunger 184, pressed outwardly by a spring 185 and having its movement limited by a pin 186 in the plunger working in a slot 187 in the arm 183. The plunger 184 carries at its outer end a roller 188 adapted to engage the edge of the record in playing position. Adjacent the end of the plunger 184 is a cam shaped stop 189 adapted to be engaged by a roller 190 on an arm 191 attached to the underside of the outer section of the telescopic sound arm 12. This device is for the purpose of adjusting the starting position of the reproducer 35 according to the size of the record being used. When the sound arm 12 is lifted by the stem 107, so as to allow the reproducer to fall back by gravity, the roller 188 is engaged by the record 192 on the playing table 15 as the same moves into playing position, thereby locating the stop 189 with reference to the record.

As the sound arm 12 telescopes the arm 191 and the roller 190 will be carried rearwardly until the roller 190 is arrested by the stop 189. The shape of this stop may be arranged so that when the sound arm is lowered, the roller 190 acting on the cam surface of the stop 189 will advance the reproducer to the proper position for engaging its needle at the beginning of the thread on the record. Provision is thus made for properly locating the starting position of the reproducer according to the size of the record being played.

It will be seen, therefore, that the invention accomplishes its objects. An apparatus is provided in which a number of records of different sizes may be placed in any desired order for playing irrespective of the relative sizes. The instrument may be originally set so as to repeat any of these records any desired number of times. The pause between any two records may be adjusted to a desired interval. The machine when adjusted with respect to these features as desired, may be started, and will carry out its operations in the exact manner desired. The records will be played in the order in which they are placed in the carriages, repetitions will be automatically made and pauses between records will take place according to the adjustments made. The operation may be arrested after any desired record. If the machine be left without attendance, it will automatically stop when the last record is played.

It is obvious that various changes may be made in details of construction without departing from the spirit of this invention; it is, therefore, to be understood that this invention is not to be limited to the specific details shown and described.

Having thus described the invention, what is claimed is:

1. In a phonograph, the combination with a carrier, of a series of turn tables thereon, a record magazine, mechanism for shifting a record from said magazine on one of said tables, and means for shifting said carrier.

2. In a phonograph, the combination with a carrier, of a series of turn tables thereon, a record magazine, mechanism for shifting a record from said magazine on one of said tables, means for shifting said carrier, a reproducer cooperating with one of said tables, and means for shifting said reproducer upon movement of said carrier.

3. In a phonograph, the combination with a record rotating carrier, of record delivering and receiving magazines, mechanism for shifting a record from carrier to said receiving magazine and for shifting a record from said delivering magazine to said carrier, and means for positioning said carrier for playing.

4. In a phonograph, the combination with a record rotating carrier, of record delivering and receiving magazines, mechanism for simultaneously shifting a record from said carrier to said receiving magazine and for shifting a record from said delivering magazine to said carrier, and means for positioning said carrier for playing.

5. In a phonograph, a record carrier, comprising, a rotatable turret, turn-tables mounted for rotation on said turret, means for delivering records to and removing them from said turn-tables, means for positioning one of said turn-tables for playing, and means for driving said positioned turn-table.

6. In a phonograph, a record carrier, record delivery and receiving magazines movable toward and from said carrier, and means operable upon movement toward said carrier to deliver a record from said delivery magazine to said carrier, and to deliver a record from said carrier to said receiving magazine.

7. In a phonograph, a record carrier, a record-delivering magazine movable toward said carrier, and operating means adapted upon such movement to place a record in engagement with said carrier and thereafter eject the record from said magazine.

8. In a phonograph, a record carrier, record-delivering and receiving magazines movable toward said carrier, and operating means adapted upon such movement to place one record in said delivery magazine on said carrier and to place another record on said carrier into said receiving magazine, and thereafter to eject said first record from said first magazine and disengage said second record from said carrier.

9. In a phonograph, a record carrier, a plurality of turn-tables on said carrier, means for positioning one of said tables for playing, means for driving said playing table, a reproducer cooperating with said playing table, and means driven from said playing table for feeding said reproducer.

10. In a phonograph, a record carrier, a plurality of turn-tables on said carrier, means for positioning one of said tables for playing, means for driving said playing table, a reproducer cooperating with said playing table, and means driven from said playing table for feeding said reproducer at different relative speeds.

11. In a phonograph, a record carrier, a plurality of turn-tables on said carrier, means for positioning one of said tables for playing, means for driving said playing table, a reproducer cooperating with said playing table, and means engaging said playing table upon positioning thereof and driven thereby for feeding said reproducer.

12. In a phonograph, a record carrier, a plurality of turn-tables on said carrier, means for positioning one of said tables for playing, means for driving said playing table, a reproducer cooperating with said playing table, and means engaging said playing table upon positioning thereof and driven thereby, for feeding said reproducer at different speeds.

13. In a phonograph, the combination with a record rotating carrier, of a delivery magazine, a receiving magazine, and mechanism adapted to operate said magazines to shift a record directly from said delivery magazine to said carrier, and from said carrier directly to said receiving magazine.

14. In a phonograph, the combination with a record rotating carrier, of delivery and receiving magazines on opposite sides of said carrier, and mechanism adapted to operate said magazine to shift a record directly from said delivery magazine to said carrier, and from said carrier directly to said receiving magazine.

15. In a phonograph, the combination with a record rotating carrier, of a magazine in which the records are placed side by side, a turn-table on said carrier, and mechanism adapted to operate said magazine to shift a record from said turn-table directly to said magazine.

16. In a phonograph, the combination with a record rotating carrier, of a magazine in which the records are placed side by side, mechanism adapted to shift a record from said magazine directly to said carrier, and means adapted to advance all the records in said magazine.

17. In a phonograph, the combination with a record rotating carrier, of a magazine in which the records are placed side by side, mechanism adapted to shift a record from said carrier directly to said magazine, and means adapted to advance all the records in said magazine.

18. In a phonograph, the combination with a record rotating carrier, of a delivery magazine, a receiving magazine, mechanism adapted to operate said magazines to shift a record directly from said delivery magazine to said carrier, and from said carrier directly to said receiving magazine, and means adapted to advance all the records in said magazines.

19. In a phonograph, the combination with a record rotating carrier, of a magazine in which the records are placed side by side, means adapting said magazine to different size records, and mechanism adapted to shift a record from said magazine directly to said carrier.

20. In a phonograph, the combination with a turntable and a reproducer, of means for successively shifting the records, and means adapted to provide a pause between successive shifts.

21. In a phonograph, the combination with a turntable and a reproducer, of means for successively shifting the records, means adapted to provide a pause between successive shifts, and means for adjusting the duration of the pause.

22. In a phonograph, the combination with a turntable and a reproducer, of means for successively shifting the records, means adapted to provide a pause between the various shifts of the successive records, and means for independently adjusting the durations of the different pauses.

23. In a phonograph, the combination with a record rotating carrier and a reproducer, of a horn passing through said carrier.

In testimony whereof I affix my signature this 26th day of June, 1922.

MALCOLM L. ORD.